Sept. 29, 1964 T. IMMESBERGER 3,150,763
SELECTIVE DISTRIBUTING CONVEYOR SYSTEM
Filed Sept. 7, 1962 4 Sheets-Sheet 1
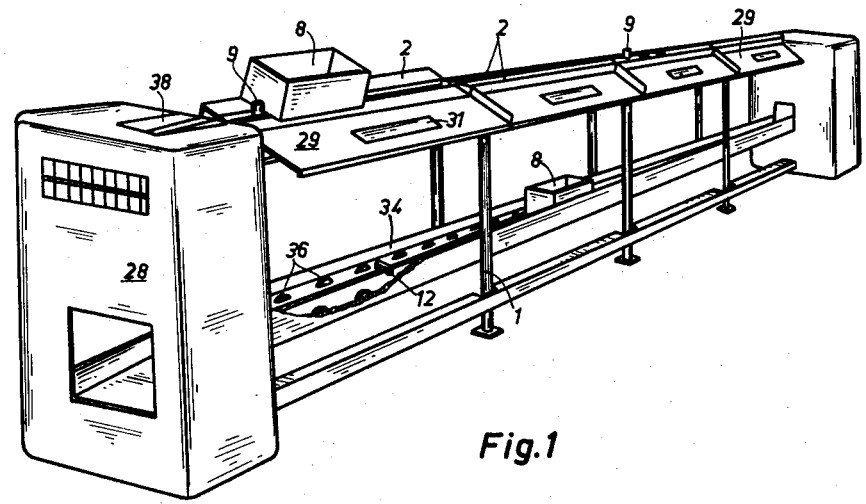
Fig.1
Fig.2
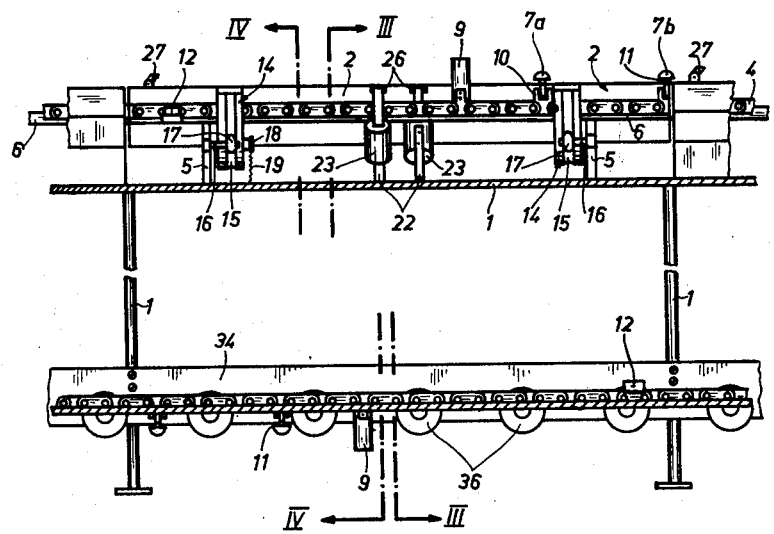
INVENTOR.
THEOBALD IMMESBERGER
BY
ATTORNEY Sept. 29, 1964  T. IMMESBERGER  3,150,763
SELECTIVE DISTRIBUTING CONVEYOR SYSTEM
Filed Sept. 7, 1962  4 Sheets-Sheet 2

INVENTOR.
THEOBALD IMMESBERGER
BY
ATTORNEY

Sept. 29, 1964   T. IMMESBERGER   3,150,763
SELECTIVE DISTRIBUTING CONVEYOR SYSTEM
Filed Sept. 7, 1962   4 Sheets-Sheet 3

INVENTOR.
THEOBALD IMMESBERGER
BY
ATTORNEY

Sept. 29, 1964    T. IMMESBERGER    3,150,763
SELECTIVE DISTRIBUTING CONVEYOR SYSTEM
Filed Sept. 7, 1962    4 Sheets-Sheet 4

INVENTOR.
THEOBALD IMMESBERGER
BY
ATTORNEY

United States Patent Office 3,150,763
Patented Sept. 29, 1964

3,150,763
SELECTIVE DISTRIBUTING CONVEYOR SYSTEM
Theobald Immesberger, Kaiserslautern, Pfalz, Germany, assignor to G. M. Pfaff A.G., Kaiserslautern, Pfalz, Germany, a corporation of Germany
Filed Sept. 7, 1962, Ser. No. 221,984
Claims priority, application Germany, Sept. 9, 1961, P 27,837
11 Claims. (Cl. 198—38)

The present invention relates to conveyor and selective distributing systems of the general type comprising an endless conveyor chain or the like arranged with its outgoing and incoming strands moving horizontally and being fitted with a multiplicity of carrier means spaced along said chain and adapted to support work pieces or containers for transporting work pieces or the like objects from a central distributing station located at one end of the conveyor and for selectively discharging or delivering the containers to a plurality of working or receiving stations continuously disposed along and at opposite sides of the conveyor.

Distributing conveyors of this type may comprise an electric control system for closing a first contact device or switch at the central station being inserted in the actuating circuit of the container discharge mechanism at a desired receiving station, such as a solenoid or electromagnetic actuator, whereupon a second switch or contact serially inserted in the same circuit and being closed by a container upon the arrival at the respective receiving station will result in the operation of the container discharge mechanism. The present invention is more particularly concerned with conveyor and distributing systems of this type and mechanism for discharging a container to either of a pair of opposite working or receiving stations continuously disposed along the conveyor.

In the case of integrated fabricating or processing operations or programs, such as for instance is the rule in the shoe industry on account of the multiplicity of styles or models and processing operations involved, the requirement exists for a highly flexible distributing conveyor system making it possible to simultaneously transport a plurality of batches of material or work pieces substantially independently of one another and irrespective of the processing operations to be performed. This aim may be achieved by the use of a distributing conveyor of the type referred to by means of which the work pieces dispatched at the central station may be selectively distributed or automatically discharged by way of the outgoing strand of the conveyor chain at any of a plurality of receiving stations continuously disposed along and at opposite sides of the conveyer, for processing in the form of sewing or any other operations.

An important object of the present invention is the provision, in connection with a distributing conveyor of the type referred to, of discharge mechanism for each of the pairs of oppositely disposed receiving stations along an endless conveyer chain, said mechanism being both simple in construction and efficient in operation, as well as capable of responding or operating safely and reliably, as required in high speed processing or the like operations.

Another object of the invention is the provision of automatic discharge mechanism of the type referred to requiring a minimum of constituent parts or elements, to reduce wear or damage to a minimum and to further increase the reliability of the conveying and distributing operations, especially in connection with multiple and high speed processing and the like operations.

Yet another object of the invention is the reduction to a minimum of the weight and bulk of the conveying and automatic discharge devices, in the interest of further increasing the operating safety, as well as to reduce the number of the moving parts of the system.

The invention, both as to its ancillary objects as well as novel aspects, will be better understood from the following detailed description, taken in conjunction with the accompanying drawings forming part of this specification and in which:

FIG. 1 is a perspective view of a complete conveyer and distributing system constructed in accordance with the principles of the invention;

FIG. 2 is a partial longitudinal vertical cross-sectional view of the conveyer of FIG. 1, encompassing a single receiving or working station;

Like reference numerals denote like parts in the different views of the drawings.

With the foregoing objects in view, the invention involves generally the provision, in connection with a distributing conveyer of the type referred to comprising an endless conveyer chain arranged with its outgoing and incoming strands moving horizontally and means for transporting thereby work pieces or the like objects, or containers holding the same, from a central distributing station located at one end of the conveyer and for selectively distributing the containers or work pieces to a plurality of receiving or working stations disposed continuously along said chain and on the opposite sides thereof, of a plurality of carrier means pivotally mounted upon said chain at predetermined spaced intervals from each other, for tilting in either lateral direction from said chain or towards a desired one of the associated pair of receiving stations disposed at the opposite side of the chain. The carrier means may be advantageously in the form of a pair of spaced rods or bars arranged transverse to the conveyor chain, to reduce weight and bulk of the movable parts of the conveyer, in accordance with the principal object of the invention.

There are further provided, in accordance with the invention, a plurality of stationary container discharge or rocker units having a horizontal surface being interrupted by a central guideway in line with the conveyer chain, each of said rocker units adjoining the adjacent rocker units of the remaining receiving stations or conveyer sections, in such a manner as to provide a substantially continuous supporting platform for said carrier means moving or sliding thereon during the operation of the conveyer.

For the latter purpose, the carrier means may be provided with anti-friction rollers or the like means to reduce wear of the moving parts of the system. In order to selectively discharge the work pieces or containers at a desired receiving or working station, further means are provided, preferably in the form of electromagnetic solenoid actuators being pre-set at the central station and controlled by a contact or switch device operated upon the carrier means or containers engaging the rocker or discharge units of the receiving stations, to rotate or tilt said rocker units towards a desired receiving station in one or the opposite direction from the conveyer chain, for the discharge of the containers. Return of the rocker units to horizontal or inoperative position may be effected by the provision of further actuating elements secured to the conveyer chain at predetermined spaced intervals relative to one another and to the coordinated carrier means and adapted to engage and cooperate with the rocker units to return the same to normal position upon completion of a discharging operation, as will become further apparent as the following description proceeds in reference to the drawings.

Figure 3:
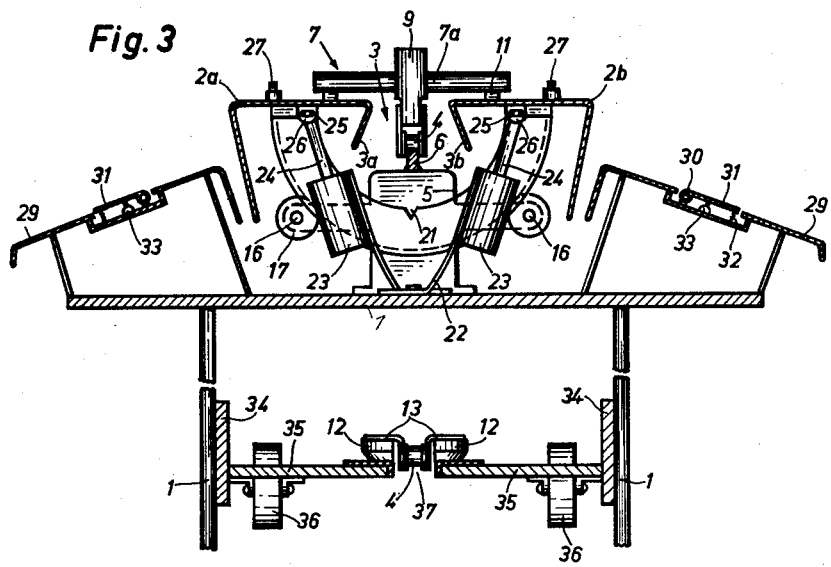
FIG. 3 is a sectional view shown on an enlarged scale and taken on line III—III of FIG. 2.

Referring more particularly to the drawings, FIG. 1 shows a centrally controlled distributing conveyer according to the invention for selectively supplying a plurality of receiving or working stations in connection with material for use with sewing or other processing or the like operations. The conveyer shown is supported by a frame 1 comprising both cross arms and vertical supports or pillars, a single receiving station being shown located between any two pillars and on the opposite sides of the conveyer, thereby dividing the conveyer into a multiplicity of adjacent sections or stations. There are furthermore provided a plurality of rocker units 2, FIGS. 2, 4, 6 and 7, one for each pair of oppositely disposed receiving stations or conveyer sections, said rocker units each comprising a pair of elongated spaced horizontal plates 2a and 2b, FIG. 3, being formed with inturned inner edge portions 3a and 3b, respectively, to provide a dovetail-shaped central guideway 3 in line with the outgoing strand of a conveyer chain 4.

The endless conveyer chain 4, FIGS. 2, 3, 5–7, arranged with its outgoing and incoming strands moving horizontally may be guided by a pair of sprockets or chain wheels (not shown) disposed at the opposite ends of the conveyer, one of said wheels being driven in conventional manner by an electric motor. In the example shown, the chain is driven in respect to the central station containing a switchboard 28 such that the upper chain portion forms the outgoing strand and the lower chain portion forms the incoming or return strand of the conveyer. In order to overcome the effects of sagging of the outgoing chain portion or strand and to provide additional longitudinal guidance of the chain 4, the latter is arranged to move upon a guide rail 6 mounted upon supports 5 which are secured at spaced intervals to the frame 1. As a consequence, the cross pins or rollers of the chain links glide upon the upper surface of the rail 6, while the lateral surfaces of the rail act as guides for the inner surfaces of the side plates or links of the chain.

Secured to the conveyer chain 4 at equi-spaced intervals are a plurality of carrier units 7 adapted to support the work pieces or containers 8 to be transported, each of said units consisting, in the example shown, of a pair of supporting rods or bars 7a and 7b arranged transversely or being normal to the chain 4. In order to fix the position of the containers 8 upon the carrier units 7, or to prevent backsliding of the containers, there are further provided a plurality of retaining dogs or pins 9 adapted to engage the rear of the containers and being secured to the chain 4 to project vertically therefrom into the guideway 3, FIG. 3. The dogs 9 are fixedly secured to the chain 4, while the bars 7a and 7b of the carrier units 7 are centrally pivoted to the chain, as shown at 10, FIG. 2, in such a manner as to enable the bars 2a and 2b to be tilted in the opposite directions from the chain 4 during a container discharge operation, as will be further described in the following. The carrier units 7 move upon the plates 2a and 2b which have a length such as to adjoin the plates of the adjacent conveyer sections or receiving stations, respectively, in such a manner as to form a continuous support or platform for said carrier units to move upon. The carrier units or bars 7a and 7b may be advantageously provided at their underface with anti-friction rollers 11 engaging the upper surface of the plates 2a and 2b, to minimize friction and wear of the parts.

Coordinated with and suitably spaced from each carrier unit 7 is an aligning and retracting member 12 being supported by a pair of brackets 13 which are in turn fixedly secured to the chain 4. The members 12 have a dovetailed cross-section and are adapted to move within the guideways 3 of the rocker units 2. Their further purpose is to effect the return of the rocker units from the tilted or discharge position, as shown by dashed lines in FIG. 4, to the normal horizontal position, as shown by full lines in the drawing. In order to ensure a safe engagement or introduction of the guide members 12 into the guideways 3, the ends of the inturned edge portions 3a and 3b of the plates 2a and 2b are slightly bent outwardly at their forward ends, as shown in the drawing, FIG. 7.

The plates 2a and 2b of the rocker units are supported by a pair of spaced cylindrical segment-shaped supports 14 being provided with a guide groove 15 which engages a pair of stationary rollers 17 arranged symmetrically to said supports in the normal or horizontal position of the rocker units. The rollers 17 may be supported by pins 16 mounted upon the ends of a pair of lateral extensions of the supports 5, as shown in the drawing, whereby to allow the rocker units to be tilted in either of the opposite directions from the chain 4 for the discharge of the containers 8.

In order to fix the central or symmetrical position of the rocker units 2, one of the pins 16 supports a lever 18 rotatably mounted thereon at one end and having its opposite end connected to the end of a coil spring 19 whose other end is affixed to the frame 1. The lever 18 carries, approximately at its center a pin 20 arranged to engage a notch 21 of the support 14 in the central position of the rocker units. Further secured to the frame 1, about midway between the supports 14 is a U-shaped bracket 22, FIG. 3, each of the two legs of which supports an electromagnetic or solenoid actuator 23 having a pull bar or rod 24 connected to the underside of one of the rocker plates 2a and 2b through a pair of slot and pin joints 25, 26, respectively.

Arranged upon the upper surface of the plates 2a and 2b of each rocker unit 2 is an electrical contact device 27, that is, one for each receiving station, the contacts of which are normally interrupted to open the exciting circuits of the respective solenoid 23. A second contact device or switch for each solenoid is arranged upon the switchboard 28 at the central or distributing station, whereby, with either of the solenoids being energized by the closing of both contacts, an electric current will be passed through the respective solenoid winding, thereby causing the solenoid armature or plunger to be retracted and to impart a tilting movement to the rocker unit in the respective direction. The armature movement to effect a full swinging movement of the rocker unit is advantageously equal to one half of the total armature operating stroke.

Figure 4:
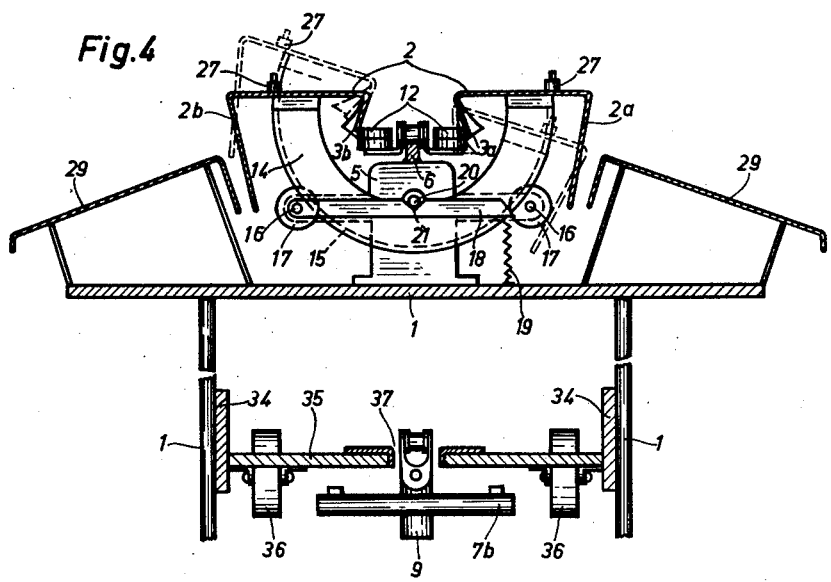
FIG. 4 is a similar sectional view taken on line IV—IV of FIG. 2.
Figure 5:
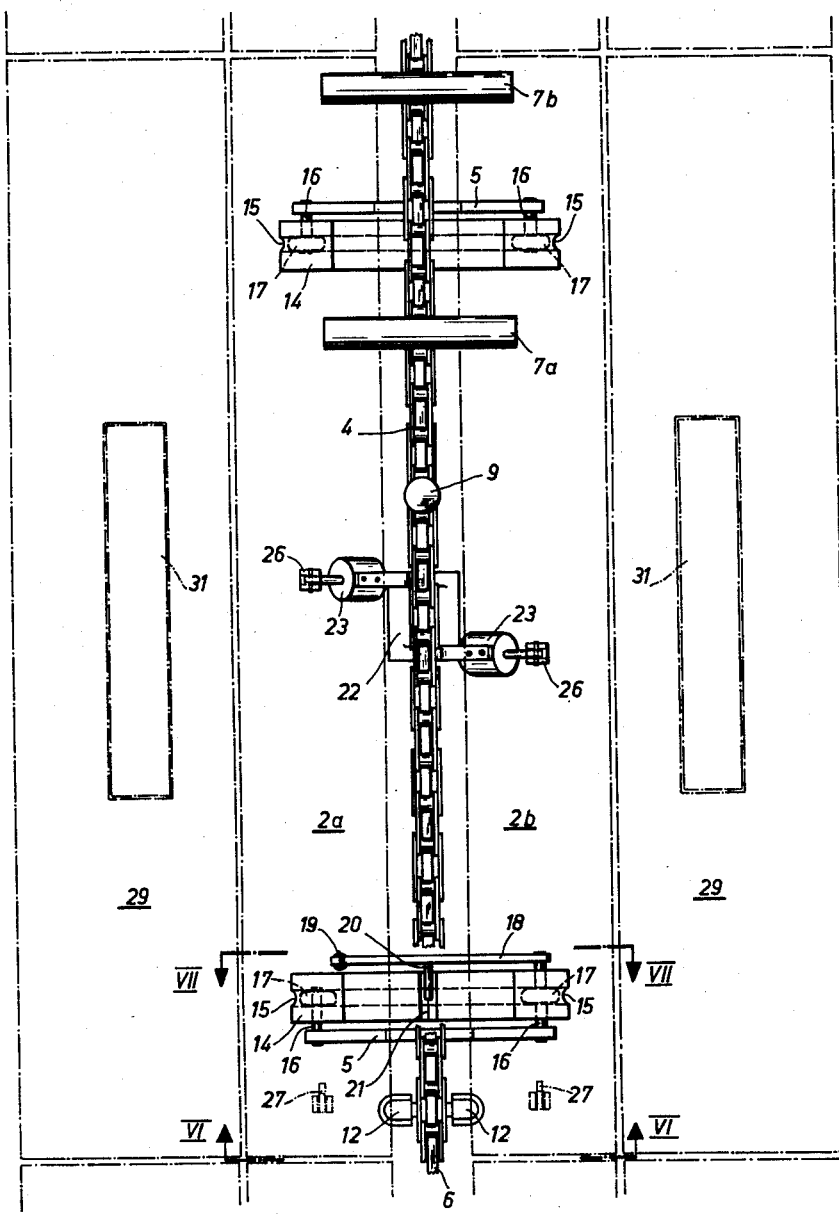
FIG. 5 is a partial plan view of the distributing conveyer of the invention.
Figure 7:
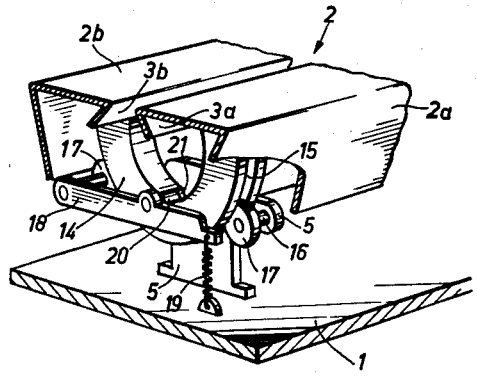
FIG. 7 is a partial perspective view taken on line VII—VII of FIG. 5.
Figure 6:
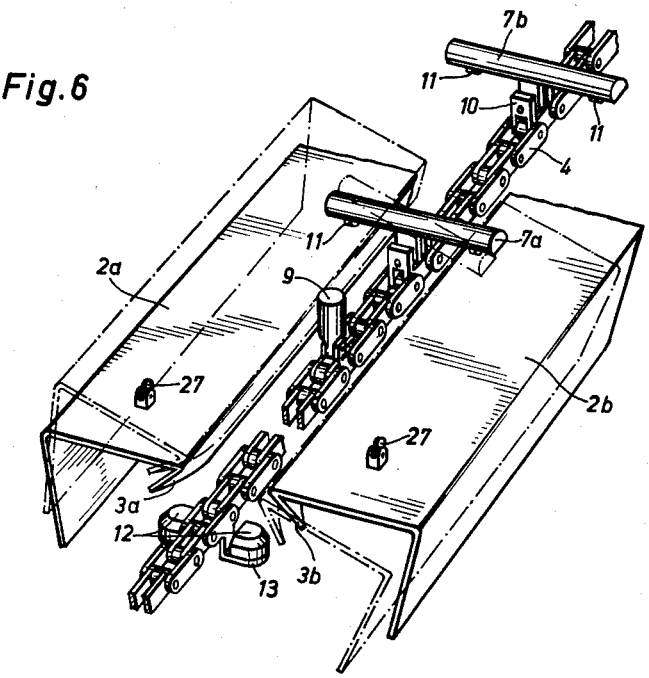
FIG. 6 is a partial perspective view taken on line VI—VI of FIG. 5.

Disposed in the direction and on the opposite sides of the frame 1 are a plurality of inclined slide plates 29 forming a vertical angle which is equal to the angle formed by the rocker plates 2a and 2b in the tilted or discharge position, FIG. 4. Plates 29 are fitted with countersunk hinges 30 rotatably supporting a control plate or strip 31, the latter being urged in an upward direction by a spring 32. Arranged below the strip 31 is a further switch 33 also being inserted in the respective solenoid circuit together with the associated contact device 27 and the main control switch at the switchboard 28, switch 33 being normally closed and interrupted upon depression of the strip 31, for the purpose described presently.

In order to return the containers 8 or work pieces from the working stations to the central station, the frame 1 has secured thereto a pair of side walls 34 and a bottom 35 forming therewith a further guideway, said bottom being fitted with rollers adapted to support the containers and having a central recess 37 in the conveying direction to accommodate the return strand of the conveyor chain 4.

In operation, after a desired working or receiving station has been selected by closing the circuit of the respective solenoid at the switchboard 28, the container 8 holding the material to be transported is inserted in a recess 38 having a width equal to the width of the containers, whereupon the inserted container will be lifted by the oncoming bars 7a and 7b of the next following carrier 7 moving in an upward direction and, upon fully engaging the bars, will be picked up and conveyed by the chain 4 to the preselected station. Upon the carrier unit supporting the container reaching and engaging the rocker plates 2a or 2b disposed at the selected station, it will operate the respective contact device 27 through the action of the weight of the container moving thereover, thus closing the exciting circuit of the associated solenoid 23 and initiating the tilting movement of the rocker unit in the desired direction, in the manner shown in dashed lines in FIG. 4.

During the conveying operation, the containers also actuate the contact devices 27 of the other stations or conveyer sections, but the associated solenoids remain de-energized due to the interruption of the circuits at the central station or switchboard 28. During the tilting movement of the rocker units 2, the carrier units 7 together with the containers supported thereby follow the movement of the former, whereby to cause the containers to slide upon the discharge plates 29. While moving over the latter, the container engages the strip 31, thus interrupting the circuit of the solenoid 23 by the switch 33 in the manner described, to initiate the return movement of the rocker unit to its normal or horizontal position.

Inasmuch as the container 8 during the movement of the chain 4 is discharged by sliding upon the carrier 7 or rocker 2, respectively, the time available for the actuation of the contact devices is limited by the conveyer speed, on the one hand, and by the dimension of the containers, on the other hand. This time in the case of high conveyer speeds may be less than the response and operating time of the solenoid 23. In such a case, the contact device 27 may be equipped with a holding relay or contact keeping the circuit energized for a sufficient time period after release of the contact device until after engagement by the container of the contact strip of the switch 33, opening thereby the circuit and causing a release of the holding contact or relay.

Return of the rocker units to normal or horizontal position, upon opening of the solenoid circuit by the switch 33, is effected by the guide element 12 being outside the range of the rocker in the tilted position and adapted to engage the outwardly flaring edges of the ends of the inturned portions 3a and 3b of the plates 2a and 2b, in such a manner as to return the rocker to its horizontal position. For this purpose, the distance between successive carrier units 7 is approximately twice the length of the plates 2a or 2b, or sections of the conveyer, while the distance between a carrier and its associated guiding or retracting element 12 is less than the length of a plate 2a or 2b, whereby to allow not more than a single carrier unit 7 and guiding element 12 to be within a single section or range occupied by a rocker unit 2. In other words, no further carrier 7 and no guiding element 12 will be within the section containing a rocker unit while the latter effects a tilting or discharge movement, whereby to enable the discharge and return operations to be carried out without interference by the elements 12. While returning to the horizontal position in the manner described, the rocker units 2 are arrested in the central position by the pins 20 engaging the notch 21, whereby to cause the elements 12 to again be guided in the guideway 3. During the return movement of the rocker units, the carrier units 7 being within the range of the latter will also be returned to their normal positions, that is, prior to the carrier units 7 leaving the respective working or receiving stations or sections.

In order to return the containers 8 to the central station, they are simply placed upon the rollers 36. The elements 12 which in the outgoing (upper) strand of the conveyer serve to effect the return of the rocker units, move above the bottom wall 35 in the incoming (lower) strand, whereby to engage and exert a push upon the containers, while the carrier units 7 and dogs 9 move below the bottom 35, in the manner shown in FIGS. 2 and 4.

In the foregoing the invention has been described in reference to a specific illustrative device or system. It will be evident, however, that variations and modifications, as well as the substitution of equivalent parts or elements for those shown herein for illustration, may be made without departing from the broader scope and spirit of the invention as set forth in the appended claims. The specification and drawings are accordingly to be regarded in an illustrative rather than in a restrictive sense.

I claim:

1. In a distributing conveyer system of the type comprising an endless conveyer chain arranged with its outgoing and incoming strands in different horizontal planes, means for transporting thereby work pieces or the like objects from a central station located at one end of said chain and selectively distributing the same to a plurality of receiving stations disposed continuously along and on opposite sides of said chain, said means comprising a plurality of carrier means pivotally secured to said chain at predetermined spaced intervals from each other for tilting in either lateral direction from said chain, a plurality of stationary rocker units, one for each pair of oppositely disposed receiving stations, each of said rocker units comprising a pair of spaced elongated and normally horizontal supporting plates on the opposite sides of said chain, said plates having inturned inner end portions, to form a guideway in line with said chain, and the ends of the plates of each said rocker unit adjoining the ends of the plates of the adjacent rocker units, to provide a substantially continuous supporting platform for said carrier means to move upon during the operation of the conveyer, means to selectively actuate said rocker means to tilt said plates in either direction from the horizontal position towards one of the associated pairs of receiving stations, whereby to simultaneously cause said carrier means to follow the tilting movement of said plates and to discharge the work pieces carried thereby, and a plurality of guiding elements carried by said chain at predetermined spaced intervals from each other and from the coordinated carrier means, said elements adapted to engage the inturned plate portions upon entering said guideway, to return said rocker units to horizontal position upon completion of a discharge operation.

2. In a distributing conveyer system as claimed in claim 1, said guiding elements adapted to serve as guide for said chain by continuously engaging said guideway in the horizontal position of said rocker means.

3. In a distributing conveyer system as claimed in claim 1, including a horizontal supporting rail to guide the outgoing strand of said conveyer chain.

4. In a distributing conveyer system as claimed in claim 1, said rocker actuating means being comprised of a pair of electromagnetic actuators for each of said rocker units arranged to tilt the same in the respective discharge direction, and switch means carried by each said plates of said units and adapted to be closed upon engagement by a carrier means moving thereover, to energize the coordinated actuator.

5. In a distributing conveyer system as claimed in claim 1, said carrier means being comprised of a pair of spaced supporting bars at right angle to and being pivotally centrally secured to said chain, said bars adapted to support containers placed thereon holding material to be transported.

6. In a distributing conveyer system as claimed in claim 5, including anti-friction rollers upon the undersurface of said bars engaging said plates.

7. In a distributing conveyer system of the type comprising an endless conveyer chain arranged with its outgoing and incoming strands moving in different horizontal planes, means for transporting thereby containers holding work pieces or the like from a central station located at one end of said conveyer by the upper outgoing strand of said chain and for selectively distributing said containers to a plurality of working stations disposed continuously along and on the opposite sides of said chain, said means comprising a plurality of carrier means for supporting said containers and being centrally pivoted to said chain at predetermined spaced intervals from each other for tilting in either direction from said chain, horizontal guide means supporting the outgoing strand of said chain, a plurality of stationary rocker units, one for each pair of oppositely disposed working stations, adjoining the outgoing strand of said chain, each of said rocker units comprising a pair of spaced elongated and normally horizontal supporting plates having inturned inner end portions, to form a guideway in line with said chain, the ends of the plates of each rocker unit adjoining the ends of the plates of the adjacent rocker units, to provide a substantially continuous supporting platform for said carrier means to move upon during the operation of the conveyer, a pair of solenoid actuators for each said rocker unit for selectively tilting the same in either direction from the horizontal position and towards one of the associated pair of working stations, whereby to simultaneously cause said carrier means to follow the tilting movement of said rocker means and to discharge the containers carried thereby, and a plurality of retracting and guiding elements carried by said chain at predetermined spaced intervals from each other and from said carrier means, to return said rocker units to horizontal position by said elements upon entering said guideway after completion of a container discharge operation.

8. In a distributing conveyer system as claimed in claim 7, said carrier means consisting of a pair of parallel supporting bars arranged transversely to and being centrally pivoted to said chain, said bars being fitted with anti-friction rollers disposed upon the undersurface thereof and engaging said plates.

9. In a distributing conveyer system as claimed in claim 7, including additional positioning dogs fixedly secured to said chain at a position behind said carrier means in respect to the moving direction of said chain and adapted to engage the container carrier by said carrier means.

10. In a distributing conveyer system as claimed in claim 7, the plates of each said rocker means being connected by segmental connecting members supported by a pair of spaced stationary rollers and said actuators having pull rods each joined to one of the plates of the respective rocker means through a slot and pin joint.

11. In a distributing conveyer system of the type comprising an endless conveyer member arranged with its outgoing and incoming strands in different horizontal planes, means for transporting thereby workpieces or the like from a central station at one end of said member and for selectively distributing the same to a plurality of receiving stations arranged continuously along and at opposite sides of said member, said means comprising a plurality of carrier means being centrally pivotally secured to said member at predetermined spaced intervals from each other for tilting in either lateral direction from said member, a plurality of stationary rocker units one for each pair of oppositely disposed receiving stations and having a horizontal surface interrupted by a central guideway in line with said member, the ends of each of said rocker units adjoining the adjacent rocker units, to provide a substantially continuous supporting platform for said carrier means to move upon during the operation of the conveyer, means to selectively actuate said rocker units, to tilt the same and the carrier means moving thereon in either direction towards one of the associated receiving stations, to discharge the work pieces carried thereby, and a plurality of retracting and guiding elements equal in number to the number of carrier means and being secured to said member at predetermined spaced intervals from each other and from the coordinated carrier means, to return said rocker units to horizontal position by said elements upon entering said guideway after completion of a work piece discharge operation.

References Cited in the file of this patent
UNITED STATES PATENTS

| | | |
|---|---|---|
| 706,294 | Beck | Aug. 5, 1902 |
| 708,759 | Dodge | Sept. 9, 1902 |
| 2,344,596 | Carmina | Mar. 21, 1944 |
| 2,648,423 | Black | Aug. 11, 1953 |
| 2,901,082 | Baumann | Aug. 25, 1959 |
| 2,934,197 | Jonson | Apr. 26, 1960 |
| 2,969,137 | Baumann et al. | Jan. 24, 1961 |
| 3,000,518 | Baumann | Sept. 19, 1961 |
| 3,082,855 | Habicht et al. | Mar. 26, 1963 |

FOREIGN PATENTS

| | | |
|---|---|---|
| 1,182,570 | France | Jan. 19, 1959 |
| 165,619 | Great Britain | July 7, 1921 |